Feb. 17, 1959  L. C. WEBB  2,873,574
COMBINATION HOT AIR AND INTERNAL COMBUSTION ENGINE
Filed May 16, 1956  5 Sheets-Sheet 1

LEON C. WEBB
INVENTOR.

BY
ATTORNEYS.

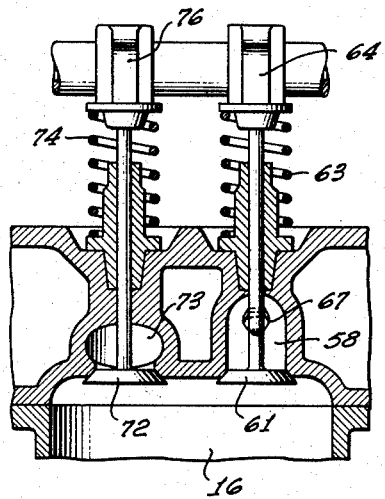
FIG. 4.
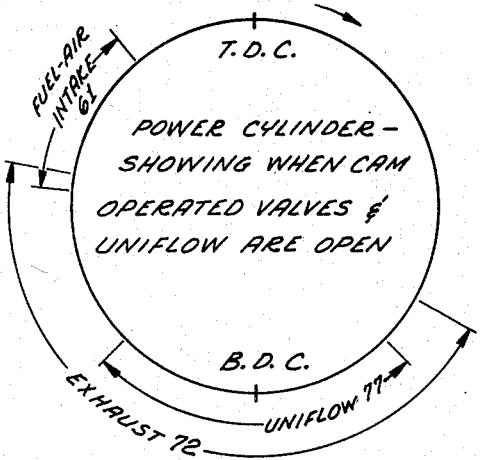
FIG. 5.
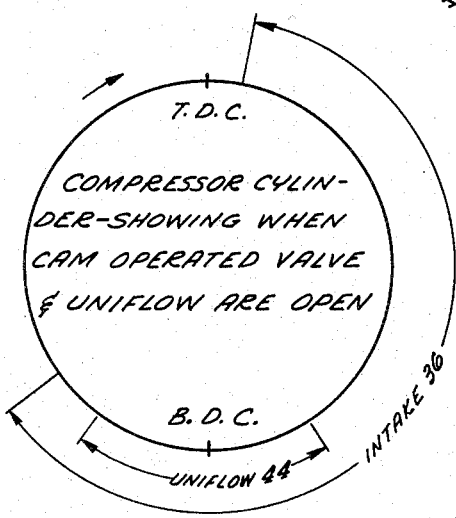
FIG. 6.
LEON C. WEBB
INVENTOR.
BY 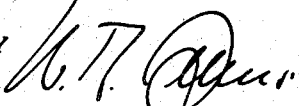
ATTORNEYS.

United States Patent Office

2,873,574
Patented Feb. 17, 1959

2,873,574
COMBINATION HOT AIR AND INTERNAL COMBUSTION ENGINE

Leon C. Webb, Van Nuys, Calif., assignor of forty percent to Clara M. Long, Van Nuys, Calif.

Application May 16, 1956, Serial No. 585,214

15 Claims. (Cl. 60—13)

This invention relates to an engine, and more particularly to a combination hot air and internal combustion engine incorporating both reciprocating and rotating elements.

In my co-pending application Serial No. 382,639, filed September 28, 1953, now Patent No. 2,837,895, issued June 10, 1958, for a Hot Air Engine, there is shown and described an engine incorporating a rotary compressor as well as compressor pistons, and also incorporating power pistons mechanically connected to the compressor pistons as by a common crankshaft. In such engine there is no combustion in the cylinders for the power pistons during running operation, all combustion instead occurring in auxiliary chambers adapted to heat the compressed air after it leaves the compressor cylinders and before introduction of such heated air into the power cylinders.

The engine described and claimed in the present application incorporates several of the basic principles of the above specified engine, but is different in a number of important respects. In the first place, compressed air from the compressor cylinders is fed directly to the power cylinders, and is not necessarily passed through any additional heating means before reaching the power cylinders. Combustion takes place in the power cylinders at all times during operation of the engine (not merely during starting as was indicated in the previous application), such combustion being extremely efficient due to the use of a novel fuel injection system. The hot compressed air from the compressor cylinders is introduced into the power cylinders after the explosions therein, and during the downstrokes of the power pistons, the arrangement being such that the hot compressed air from the compressor cylinders acts as a power booster with resultant greater power imparted to the power pistons and increased efficiency.

To contrast the present engine with conventional ones such as the V-8 types found on most present day automobiles, combustion occurs in only one bank of four cylinders (termed "power cylinders") and such combustion is two-cycle instead of four-cycle. The other bank of four cylinders is adapted during the upstrokes of the pistons therein to feed hot compressed air to the power cylinders, and during the downstrokes of the pistons therein to impart power to the crank shaft due to the pressure of compressed air from a rotary compressor acting against such pistons. The described arrangement results in greatly increased efficiency, as compared to conventional engines, for a number of reasons including the following: The mean effective pressure acting against the power pistons durirng their downstrokes is greatly increased, and total power is greatly increased since the power pistons during their downstrokes is greatly instead of four-cycle. Exhaust gases from the power cylinders are employed to operate the rotary compressor, which in turn imparts power to the compressor pistons during their downstrokes, this being contrasted with conventional engines in which much heat and power goes out the exhaust pipe and is lost. The advantages of fuel injection are achieved to their fullest extent, and with equipment which is simple both to construct and to maintain, there being no necessity for complicated fuel injection systems such as are beginning to be employed in conventional automobile engines.

In view of the above, it is an object of the present invention to provide an extremely efficient engine for automobiles, trucks, busses, and the like, which incorporates the advantages of several rotary and piston type engines and which is relatively simple and economical to construct and operate.

A further object is to provide means for imparting a high mean effecting pressure to the power pistons during the downstrokes thereof and to effect rapid exhausting or scavenging of the combustion products during the upstrokes thereof.

Another object is to provide a fuel injection system which is extremely simple to time and which will produce an equal pressure and mixture in each of the power cylinders.

A further object is to provide an engine which may be manufactured with present manufacturing machinery, with only minor changes, and which may be made to operate with either gasoline or diesel fuel.

An additional object is to provide an engine which operates smoothly and efficiently at high R. P. M., and with relatively little strain on the bearings and other components of the engine, due to the relationship between the power pistons and their cooperating compressor pistons.

A further object is to provide an engine which is so constructed that there is relatively little heat loss either to the cooling water or out the exhaust pipe, with resultant great increase in efficiency.

A further object of the invention is to provide an engine which is easy to start, and which does not produce substantial amounts of undesired carbon even when operated on short runs only.

These and other objects and advantages of the invention will be more fully set forth in the following specification and claims, which are to be considered in connection with the attached drawings to which they relate.

In the drawings:

Figure 4 is a fragmentary sectional view taken along line 4—4 of Figure 1, illustrating the fuel-air inlet valve and the exhaust valve of a power cylinder;

Figure 5 is a diagram illustrating the times during which various valves associated with each power cylinder are open during one revolution of the crankshaft;

Figure 7:
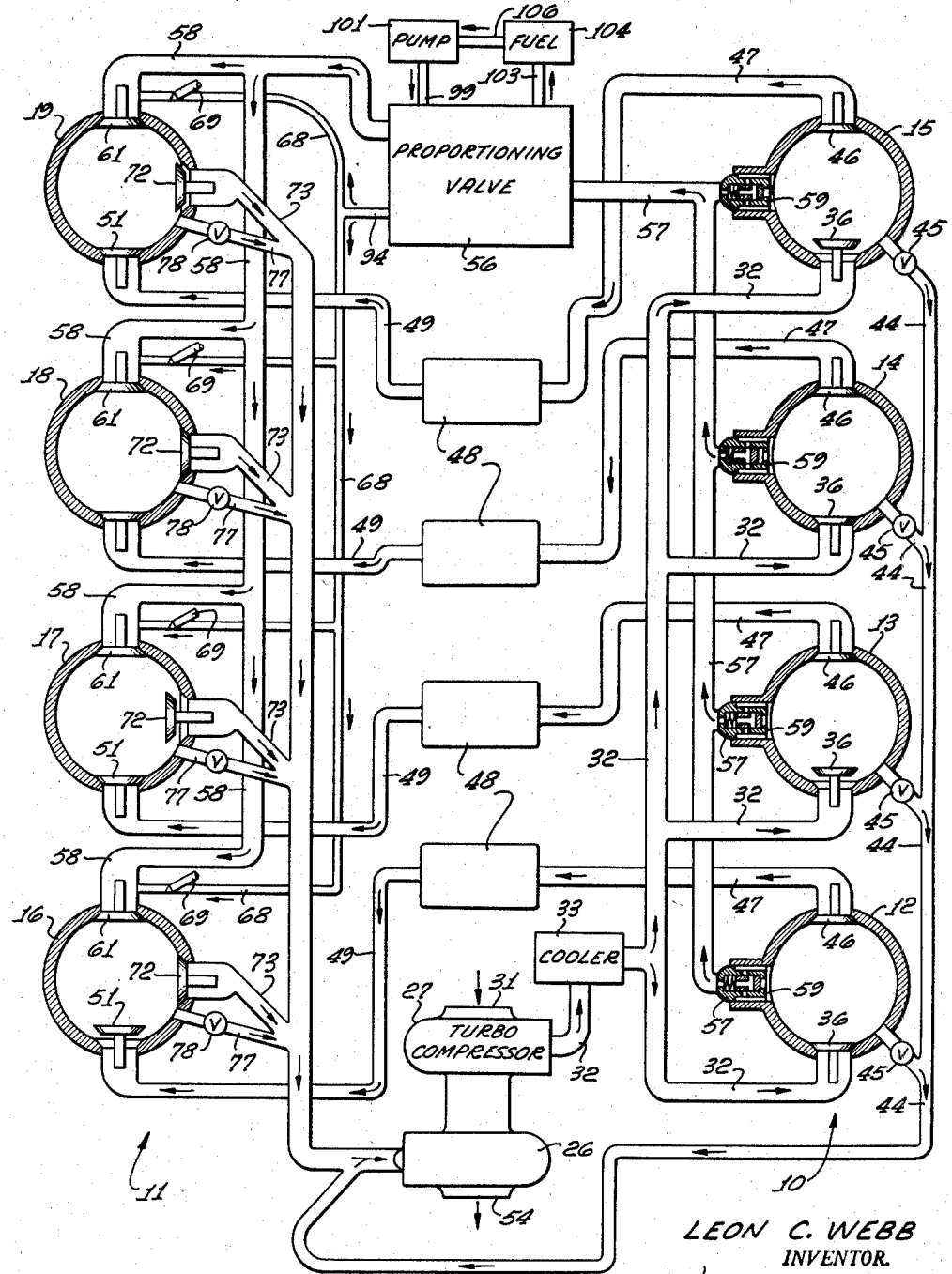

Figure 6 corresponds to Figure 5 but illustrates the times during which various valves associated with each compressor cylinder are open during one crankshaft revolution; and Figure 7 is a schematic view illustrating all of the eight cylinders and their associated manifolds and connections.

Figure 1:
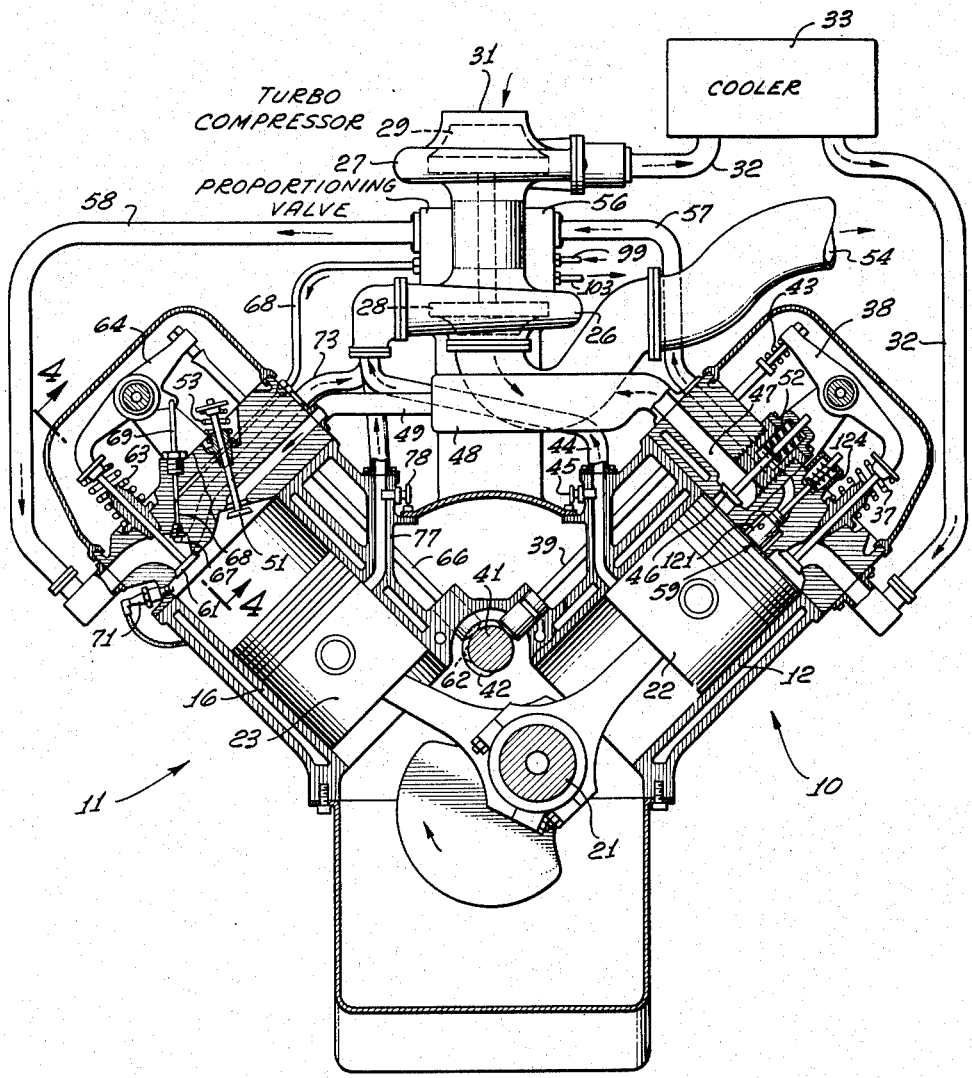
Figure 1 is a transverse sectional view of an engine constructed in accordance with the present invention, as viewed from the front of the automobile or other vehicle in which the engine is mounted, the showing being largely schematic.
Figure 2:
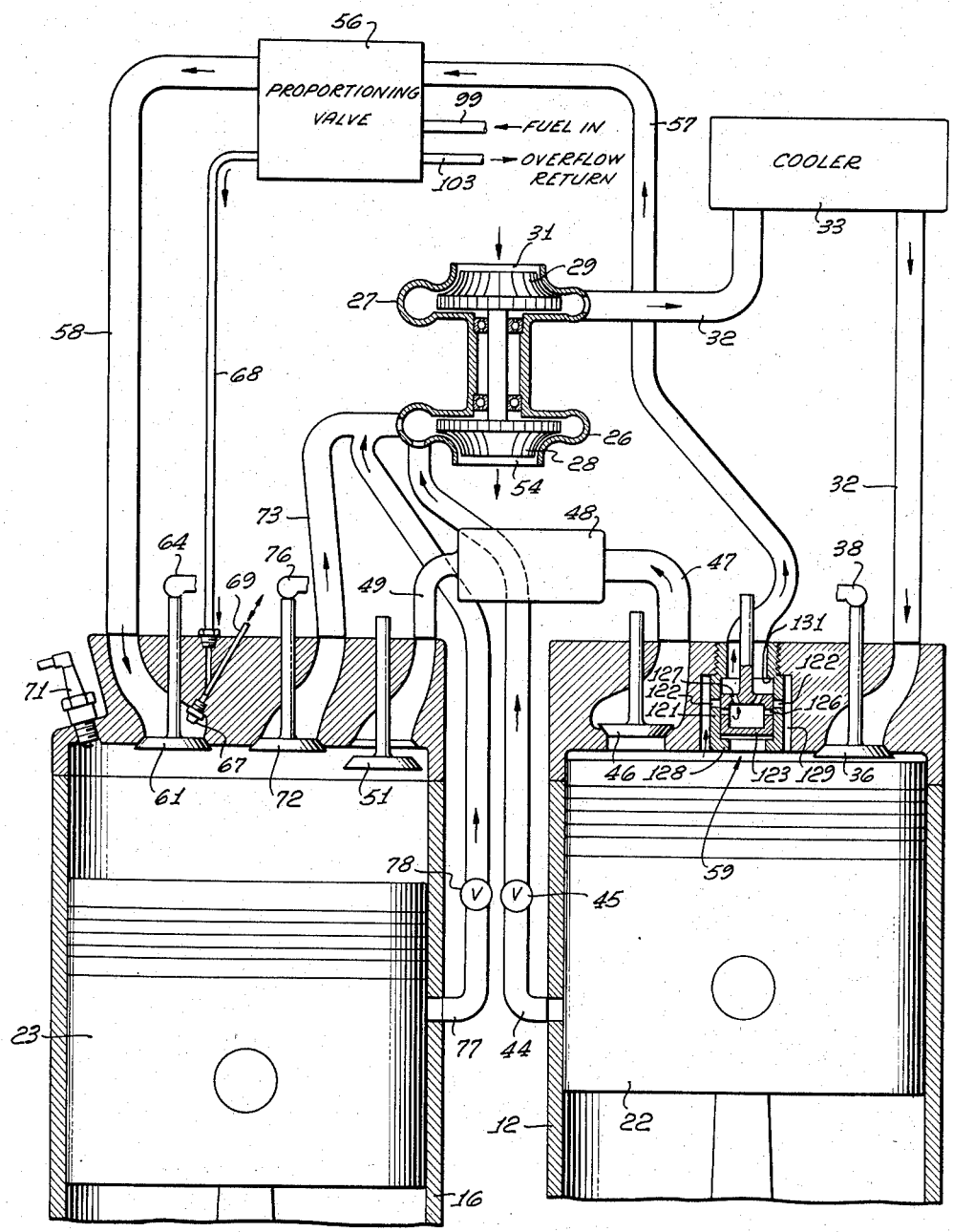
Figure 2 is a schematic illustration of the various conduits and elements between a power cylinder and its associated compressor cylinder.
Figure 3:
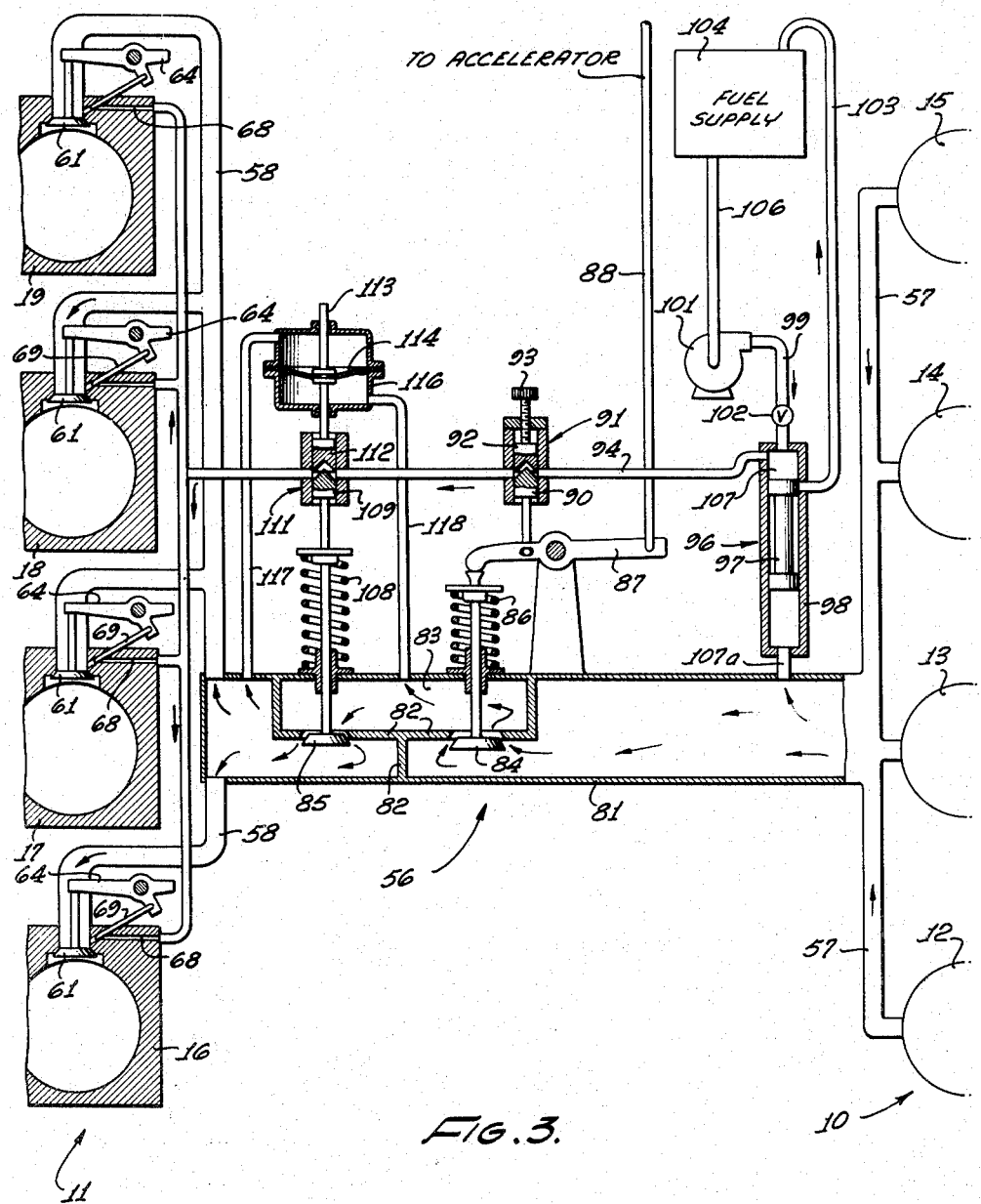
Figure 3 is a schematic illustration of the fuel-air supply and injection system of the invention.

It is to be understood that Figures 1 and 2 of the drawings are schematic in that they only show two associated cylinders and pistons, showings of certain manifolds which connect the various cylinders of the V-8 engine being omitted for purposes of simplicity. In Figures 3 and 7, on the other hand, the various manifolds are schematically represented. Figures 3 and 7 show the system as it actually exists in a V-8 engine. For purposes of clarity the manifolds will not be given specific reference numbers, the various pipes or conduits being instead numbered in all views as though there were only two associated cylinders in the engine. Also, the main body of the detailed description will be given as though there were only two cylinders.

Referring now to Figure 1 in particular, the invention is illustrated as incorporated in a V-8 engine of the general shape found in many present day automobiles. Such engines conventionally have two banks 10 and 11 of four cylinders each, the bank 10 being referred to in the present application as the "compressor" bank and bank 11 being referred to as the "power" bank. Bank 10 and the four compressor cylinders 12-15 contained therein are disposed on the right side of the engine as viewed from the front (Figure 1), whereas bank 11 and its four power cylinders 16-19 are disposed on the left side of the engine. The pistons in all of the cylinders 12-19 are connected to a standard crankshaft 21 having four cranks offset 90 degrees from each other, the crankshaft being adapted to rotate clockwise as viewed in Figure 1. As shown in Figures 3 and 7, cylinders 12-16, 13-17, 14-18, 15-19, correspond in location with each other, the pistons in such associated cylinders being connected to corresponding portions of crankshaft 21.

To simplify description of the engine, as above indicated, the operation of only two corresponding cylinders will be described in detail, it being understood that the remaining pairs of cylinders operate in the same manner. These corresponding cylinders are compressor cylinder 12 and power cylinder 16 which contain, respectively, compressor and power pistons 22 and 23, as shown in Figures 1 and 2. As in the case of all the associated piston pairs in the engine, compressor piston 22 and power piston 23 are 90 degrees out of phase with each other, so that piston 22 is at top dead center (Figures 1 and 2) while power piston 23 is approximately half-way in its travel from top dead center to bottom dead center. The power piston is thus ahead of the compressor piston, since it arrives at top dead center first.

Except as will be specifically described hereinafter, the illustrated engine is constructed in the same manner as standard V-8 engines. Thus, the cooling system, oil system, etc., are substantially the same as in ordinary V-8 engines. It is to be understood, however, that the concepts of the invention are not necessarily limited to V-8 engines since they may be incorporated in certain other types.

With the above basic concepts and understandings in mind, there will next be described the elements which connect the two representative associated cylinders 12 and 16, such description being made with particular reference to Figures 1 and 2. Referring to these figures, there is provided a suitable turbo-compressor unit having a turbine portion 26 and a compressor portion 27. The turbo-compressor may have one or more stages of compression, in accordance with conventional design, and preferably comprises turbine and compressor rotors 28 and 29 mounted on a common shaft within a common housing. Compressor portion 27 is adapted to draw air through an inlet 31 and discharge heated compressed air into a pipe or conduit 32 leading to the compressor cylinder 12. Preferably, a suitable cooler 33 is interposed in conduit 32 in order to cool the air prior to its introduction into the cylinder.

The flow of compressed air from conduit 32 into cylinder 12 is controlled by a poppet valve 36 that is normally urged to seated or closed position by a compression spring 37. A conventional rocker arm 38 and push rod 39 are employed to associate the valve 36 with the camshaft 41 of the engine. Camshaft 41 is of conventional design except that it is driven at the same rotational speed as crankshaft 21, instead of at a 2-to-1 ratio relative to the crankshaft as is the case with conventional four-cycle engines. Mounted on the crankshaft is a relatively long, unpeaked cam 42 which is so adjusted that poppet valve 36 will be open during the downstroke of piston 22 and will be closed during the major portion of its upstroke. Preferably, and as shown in Figure 6, the cam 42 is so constructed and mounted that valve 36 will open approximately 10 degrees after top dead center (T. D. C.), and will close approximately 30 degrees after bottom dead center (B. D. C.).

Push rod 39 should be associated with rocker arm 38 by means of a sliding connection and a compression spring 43. With such construction, intake poppet 36 will not open when there is an excessively high pressure in cylinder 12, despite the fact that cam 42 is attempting to effect poppet opening. The poppet 36 will, however, open as soon as the cylinder pressure reduces sufficiently, the relatively strong spring 43 plus the pressure in conduit 32 then overcoming the spring 37 and the pressure in the cylinder.

When poppet 36 is open, air pressure from compressor 27 acts against the top of piston 22 and imparts a substantial amount of power to crankshaft 21 during substantially the entire piston downstroke. As the piston approaches bottom dead center, its upper surface moves by and thus opens an exhaust port or conduit 44, the latter communicating with the inlet of turbine portion 26 of the turbo-compressor. As indicated in Figure 6, the location of conduit 44 is such that air may flow therethrough from a time when the piston is approximately 20 degrees before bottom dead center (B. D. C.), to a time when the piston is approximately 20 degrees after bottom dead center. The flow of air through exhaust port or conduit 44, which may be termed a "uniflow," may be controlled by a suitable valve 45.

After the piston 22 on its upstroke has blocked the uniflow or exhaust conduit 44, the air in cylinder 12 is subjected to a very substantial compression and heating effect. Outward flow of the resulting hot compressed air is controlled by an unloader or outlet valve 46, the latter communicating through a pipe or conduit 47 with a reservoir chamber 48. Chamber 48 is, in turn, connected through a conduit 49 to cylinder 16, the flow into the cylinder being controlled by a valve 51. As shown in Figure 7, each compressor cylinder is directly connected to its associated power cylinder by elements 47—49, there being no manifolds in such connections.

Outflow valve 46 is so constructed that it is normally held closed by a spring 52, but is opened when the pressure in cylinder 12 becomes sufficiently high. Conversely, inflow valve 51 is normally held seated by a spring 53, being shifted to open position when the pressure in conduit 49 becomes sufficiently high. It is pointed out that with the described constructions of valves 46 and 51 air may only flow from cylinder 12 to cylinder 16, and not in the reverse direction, this being because the valves are so seated that they act as one-way valves.

The spring 52 has a strength such that poppet valve 46 will open at a suitable relatively low pressure differential thereacross. The spring 53 has a strength such that its poppet 51 will open, after the explosion and subsequent lowering of pressure in cylinder 16, at a pressure (in conduit 49) which is substantially lower than the maximum pressure delivered to conduit 47 and reservoir 48 from compressor cylinder 12. Spring 53 is, however, sufficiently strong that poppet 51 will close at a relatively high pressure.

To summarize the operation of the elements thus far described, air is compressed in rotary compressor 27 to approximately 15–25 p. s. i., for example, and is then passed through conduit 32 into compressor cylinder 12 when the cam operated valve 36 is open as previously described. After the piston 22 on its downstroke passes the opening to uniflow conduit 44, a portion of the air from rotary compressor 27 flows through the conduit 44 and thus through turbine 26 to its outlet 54. Such passage of air from rotary compressor 27 through the uniflow conduit 44 to the turbine is beneficial in several respects, one of which is that it provides substantial desirable cooling to the cylinder 12 and piston 22. Furthermore, such passage of air through uniflow 44 permits high speed operation of the turbo-compressor at all times, even at low engine speed. Since turbo-compressors are more efficient when operated at high speed than when operated at low speed, the high speed operation permitted by uniflow 44 increases the overall efficiency of the engine.

As soon as piston 22 has blocked the opening to uniflow 44, further upward movement of the piston causes a great additional compression of the air. In this connection it is pointed out that none of the pressure from the rotary compressor 27 is lost due to operation of uniflow 44, since (Figure 6) the intake valve 36 from the rotary compressor remains open until after closing of uniflow 44. When the pressure of the air in cylinder 12 substantially exceeds that in conduit 47 and reservoir 48, which occurs when piston 22 approaches top dead center, poppet 46 opens and permits flow of air into the conduit 47 and reservoir. At the same time, and as will be described in detail hereinafter, the pressure in power cylinder 16 is decreasing, and reduces to a value such that poppet 51 will be opened by the air pressure in conduit 49. Hot compressed air thus flows past poppet 51 into power cylinder 16 and expands against power piston 23, thus imparting a substantial amount of work to such piston and to crankshaft 21. This additional power is imparted to piston 23 after that created due to the explosion of the gas-air mixture in the power cylinder, and has the very important effect of increasing the mean effective pressure in the power cylinder. As soon as the pressure in conduit 49 decreases to a predetermined value, determined largely by the setting of spring 53, poppet 51 closes and substantial pressure is trapped in reservoir 48. The reservoir pressure remains at a lowered value until the next upward stroke of compressor piston 22 effects an increase of the reservoir pressure and consequent opening of poppet 51 to repeat the operation.

The volume of reservoir 48 and associated conduits is selected so that the maximum air pressure from the compressor cylinder will never exceed a safe limit. It is to be understood, of course, that where the engine block and other components are strongly constructed, such as for diesel operation, the reservoir 48 will be substantially smaller, and the pressures involved will be higher than for gasoline operation.

Proceeding next to a description of the means for delivering the desired fuel-air mixture to power cylinder 16, and to the means for exhausting air and products of combustion from the power cylinder, a fuel-air proportioning valve 56 is connected by a conduit 57 to compressor cylinder 12, and by a conduit 58 to power cylinder 16. Compressed air from cylinder 12 is thus passed, under the control of a regulating valve 59 to be described below, through the proportioning valve 56 to the power cylinder, introduction of air into the latter being under the control of a poppet valve 61 operated by a cam 62 on camshaft 41. As best shown in Figure 4, the poppet 61 which controls the inflow of air (and fuel) into power cylinder 16 is urged to seated position by a compression spring 63 and is adapted to be opened by a conventional rocker arm 64. Arm 64 is, in turn, operated by a push rod 66 which is periodically engaged by the cam 62 to effect valve opening. The cam 62 is relatively short and peaked, as compared to cam 42, so that the poppet 61 is only open for a short period of time, before power piston 23 reaches top dead center. For example, as shown in Figure 5, cam 62 may be so constructed that poppet 61 opens at 85 degrees before top dead center and closes at 40 degrees before top dead center.

At the same time that poppet 61 is opened, fuel is introduced into conduit 58, at a point adjacent the poppet 61, from an injector nozzle 67 which is connected by a fuel line 68 to proportioning valve 56. As best shown in Figures 1 and 3, flow of fuel to injector nozzle 67 is controlled by a valve or piston rod 69 which is connected to a crank on rocker arm 64. Valve rod 69 is adapted when the rocker arm 64 is shifted to open poppet 61 to permit flow of fuel through line 68, and when the rocker arm is shifted to close poppet 61 to block flow of fuel through line 68. The valve rod is thus so constructed and arranged that fuel is injected through nozzle 67 during the time that poppet 61 is open, and at no other time. Such direct relationship between the fuel injector and the rocker arm for inlet valve 61 results in great simplicity of operation and manufacture, and in extreme reliability and efficiency of use.

After introduction of the fuel-air mixture, the poppet 61 closes and further upward movement of power piston 23 effects compression of such mixture until the power piston reaches top dead center. When the power piston reaches top dead center, or a point slightly in advance thereof, the fuel-air mixture is ignited by a spark from a spark plug 71 which is provided in the cylinder 16 adjacent poppet 61. The spark plug 71 is supplied with electricity by a conventional distributor, but one which is adapted to supply sparks to four cylinders only and once during each downstroke of the pistons in such cylinders instead of once during each alternate downstroke as is the case with conventional V-8 engines. The preferred firing order is 1—3—4—2, that is to say power cylinders 16—18—19—17.

The resulting explosion of the fuel-air mixture supplies a very large amount of power to the downwardly moving piston 23 due to the high initial pressure of the expanding combustion products. As previously described, as soon as piston 23 has moved downwardly sufficiently far to reduce the pressure in the cylinder 16 to a point such that valve 51 opens, hot compressed air from reservoir 48 and conduit 49 is introduced into the cylinder 16 where it expands and imparts additional power to piston 23. As piston 23 approaches the bottom of its stroke, a cam operated exhaust poppet valve 72 (Figures 2 and 4) is opened to permit exhausting of gases from the upper end of the cylinder and through a conduit 73 to the inlet to turbine 26. Poppet 72 is normally held seated by a compression spring 74 and is actuated to open position by a rocker arm 76 which is operated by a suitable push rod (unshown) and a cam (unshown) on camshaft 41. As shown in Figure 5, the cam is so constructed that exhaust poppet 72 will open approximately 60 degrees before bottom dead center, and will close approximately 80 degrees before top dead center.

It is to be understood that the power cylinder may be adapted to operate in the manner of a diesel, in which case spark plug 71 would be omitted and nozzle 67 would be replaced by a diesel injector. The illustrated system is for gasoline operation.

In order to provide an extremely rapid and efficient scavenging of combustion products and air from power cylinder 16, a uniflow exhaust conduit 77 is connected to the power cylinder at a point relatively adjacent the upper surface of piston 23 when the piston is at bottom dead center. As shown in Figure 5, the uniflow 77 is opened approximately 45 degrees before bottom dead center and is closed approximately 45 degrees after bottom dead center. A control valve 78 is preferably provided in uniflow conduit 77 in order to regulate the flow of exhaust products therethrough.

As in the case of uniflow 44 and exhaust conduit 73, uniflow conduit 77 connects to the inlet of turbine 26. It follows that exhaust products from all three of these conduits flow radially inwardly through the turbine rotor 28 to effect rotation thereof, after which they flow axially outwardly through the turbine exhaust 54. In order to aid in the scavenging action, the outlets of all of the exhaust conduits 44, 73 and 77 are preferably directed toward the turbine 26 and are so constructed as to provide an aspirating or jet effect.

The fuel-air proportioning valve 56 and closely associated components will next be described, with particular reference to Figure 3. Valve 56 comprises an air duct or conduit 81 connected at one end to conduit 57 and at the other end to conduit 58. Provided in the duct 81 are partition means 82 which define an internal chamber 83 in the duct. The construction of partition means 82 is such that all air flowing from conduit 57 to conduit 58 must pass first into and then out of the chamber 83, under the control of two poppet valves 84 and 85. The first poppet valve 84 is urged to closed position by a spring 86 but may be opened by a lever or rocker 87 upon shifting of a throttle rod 88 which leads to the accelerator of a vehicle.

Lever 87 is also connected to one slidable component 90 of a first fuel valve 91. The other slidable component 92 of the valve 91 is adapted to be manually adjusted upon turning of a screw 93, it being understood that the components 90 and 92 are suitably formed so that the flow of fuel through a line 94 connecting to the previously described fuel line 68 will be either increased or diminished depending upon the relative positions of the components 90 and 92. The connection between lever 87 and valve 91 is such that the valve 91 will be shifted to a more open position when throttle rod 88 is shifted in a direction effecting opening of poppet valve 84.

Fuel flows to line 94, and thus to line 68 and the injector nozzle 67, from a regulating valve 96 having a floating piston 97 therein. One end of the casing 98 of the regulating valve is connected both to line 94 and to a line 99 leading to the outlet of a relatively high pressure fuel pump 101, there being a check valve 102 in the line 99 to prevent reverse flow of fuel therethrough. Such end of the casing 98 is also connected, by a return or overflow line 103, to the fuel tank or supply 104 which feeds pump 101 by means of a line 106. The opening to line 94 is relatively close to the end of casing 98, whereas the opening to return or overflow line 103 is relatively remote from such end, so that a chamber 107 of substantial size is formed above floating piston 97 when its upper end is disposed adjacent the opening to overflow 103.

The lower or opposite end of casing 98 connects through a conduit 107a to duct 81, and is thus subjected to the pressure of the air delivered to duct 81 from conduit 57. As will be described below, the air flowing through conduit 57 is at a relatively constant pressure, such as 60 p. s. i., due to the operation of regulating valve 59 (Figures 1 and 2).

The fuel pump 101 is so operated as to deliver fuel at a pressure higher than that in duct 81, for example at a pressure of 100 p. s. i. where the pressure in duct 81 is 60 p. s. i. It follows that floating piston 97 will move downwardly to a position such that the pressure in chamber 107, and thus in fuel line 94, is equal to the pressure at the lower side of piston 97, which is the same as the pressure in conduit 81. Stated otherwise, piston 97 will move downwardly until the overflow through line 103 is sufficient to reduce the fuel pressure in chamber 107 to the same pressure as that in conduit 81. The desired pressure of the fuel in chamber 107 and connected lines 94 and 68 is thus achieved.

It is a feature of the valve 96 that upon starting of the engine, before fuel pump 101 has had a chance to build up pressure, fuel trapped in chamber 107 will be injected into lines 94 and 68 due to upward shifting of piston 97 as air pressure builds up in pipes 57, 81 and 107a. This effects a rapid flow of fuel to the injector nozzle 67 and thus facilitates starting of the engine. Such upward shifting of piston 97 does not operate to return fuel to pump 101, because of the presence of check valve 102.

The second poppet 85, which controls the outflow from air chamber 83 as distinguished from poppet 84 which controls the inflow of air thereto, is normally urged to seated position by a spring 108. Poppet 85 is adapted to be pressure-shifted to open position after the poppet 84 has been held open for a sufficient length of time to permit building up of sufficient pressure in chamber 83. The poppet 85 is connected to one movable component 109 of a second fuel valve 111 in line 94. A second movable component 112 of valve 111 is connected to a stem 113 which is operated by a diaphragm 114 disposed in a suitable casing 116. The portion of casing 116 above the diaphragm is connected by a line 117 to the downstream end of conduit 81, that is to say the end thereof adjacent the opening to conduit 58. Casing 116, below diaphragm 114, is connected by a line 118 to chamber 83. A suitable temperature responsive device, not shown, may be associated with the diaphragm or other elements of the fuel system in order to increase the flow of fuel to the power cylinder during cold starting and operation of the engine.

During normal operation of the engine, when power is being taken therefrom and it is not merely idling, the pressure ratio in the chambers above and below diaphragm 114 will remain relatively constant, so that the position of upper component 112 of fuel valve 111 will remain fairly constant. Lower valve component 109 will, however, open or lower each time the poppet 85 is opened due to increased pressure in air chamber 83, which means that when air flows out of the chamber 83 past poppet 85 additional fuel will be fed through valve 111 to the fuel line 68. This combined operation of poppet 85 and fuel valve 111, together with the combined operation of poppet 84 and its fuel valve 91 which also operates to permit additional flow of fuel when poppet 84 is opened by throttle valve 88 to increase the air flow, means that the fuel-air ratio delivered by proportioning valve 56 will be relatively constant during normal engine operation.

When the engine is merely idling and no power is being delivered thereby, the intake manifold pressure to the power cylinders is lowered substantially, which means that the pressure at the downstream end of conduit 81 will also be lowered since such end is connected directly to the manifold (conduit 58). This lowered pressure, which is transmitted through line 117 to the portion of diaphragm casing 116 above diaphragm 114, results in elevation of the diaphragm and thus of stem 113 and upper valve component 112. It follows that an increased flow of fuel will be effected during idling, as is desired for proper idling operation. The diaphragm not only aids in idling, but provides a modulating action which aids in causing proper operation under varying loads.

Referring next to Figures 1 and 2 for a detailed description of the regulating valve 59 in the head of cylinder 12, a cylindrical valve casing 121 having centrally disposed radial ports 122 is threaded into the cylinder head in communication with conduit 57 leading to proportioning valve 56. A hollow piston 123 is slidably mounted in casing 121 and is urged to a lower seated position by spring 124 (Figure 1). Piston 123 is also provided with radial ports 126, and with axial exhaust ports 127 communicating with conduit 57.

When the hollow piston 123 is seated by spring 124 on a stop neck portion 128 of casing 121, radial ports 126 in the piston are below casing ports 122. Flow of air from the cylinder 12, through passages 129 communicating with the casing ports 122 is therefore blocked. Also, when piston 123 is at its extreme upper position, seated against a shoulder portion 131 of the casing, ports 126 are above ports 122 and the flow of air is again blocked. However, the ports 122 and 126 will be registered momentarily during shifting of piston 123 from its lower to its upper position, due to increased air pressure in cylinder 12, which will result in momentary flow of air from the cylinder 12 into the conduit 57. This air is at a predetermined pressure, such as 60 p. s. i. in the illustration, as determined by the strength of spring 124 and other factors.

Operation

To summarize the operation of the combination hot air and internal combustion engine of the invention, let it be assumed that the engine is initially in a stopped condition. A conventional starter motor, not shown, is then employed to turn over the crankshaft 21, and throttle rod 88 (Figure 3) is shifted to effect opening of poppet 84 and fuel valve 91. The upward shifting of compressor piston 22 will then feed air through regulator valve 59 into conduit 57, and thus into conduit 81 and the lower end of valve casing 98 (Figure 3). The air flowing into conduit 81 will enter chamber 83 and will force poppet 85 open, which in turn will open the second fuel valve 111. Also, the air in casing 98 below piston 97 will shift the latter upwardly and inject fuel from chamber 107 into line 94, and past valves 91 and 111 to line 68. Fuel and air are thus rapidly transmitted to cylinder 16 and will cause combustion, due to the operation of spark plug 71, after only a few revolutions with a cold motor and possibly only one revolution with a warm motor. As soon as combustion occurs in the power cylinder 16, the entire cycle starts and turbine 26, compressor 27, pump 101, etc., are all operated to effect normal running operation of the engine.

When the engine is running in a normal manner, air is sucked into the compressor intake 31 and forced through conduit 32 and cooler 33 to compressor cylinder 12, under the control of poppet 36. Because of the shape of cam 42 on camshaft 41, intake poppet 36 is maintained open (Figure 6) during substantially the entire downstroke of compressor piston 22 and also during the initial portion of its upstroke. Compressed air from compressor 27 is thus fed into the compressor cylinder continuously until the piston 22 has moved upwardly to block the uniflow exhaust conduit 44, so that the subsequent upward movement of piston 22 effects a very substantial additional compression of the air. As described heretofore in detail, the air from rotary compressor 27 imparts a substantial amount of power to piston 22 and thus crankshaft 21 during piston downstroke; and the outflow of air through uniflow 44 when the piston is in its lower position has a desirable cooling effect and also operates to increase the efficiency of the turbocompressor.

Because of the 90 degree out-of-phase relationship between compressor piston 22 and its associated power piston 23 (the power piston being ahead of the compressor piston), the compressor piston will just be approaching its illustrated top dead center position (Figure 1) at the same time that power piston 23 is moving downwardly and has completed almost half of its stroke. It follows that the high pressure air present in compressor cylinder 12 during the latter portions of compressor piston upstroke will force its way past spring loaded poppet 46 and through conduits 47 and 49, and chamber 48, past poppet 51 into the power cylinder at a time subsequent to the explosion in the power cylinder (but before exhaust therefrom) and when the pressure in the power cylinder has declined substantially. The air thus injected from the compressor cylinder 12 to power cylinder 16 expands against the power piston 23 and adds to it a very substantial amount of work additional to that created by the explosion in the power cylinder.

As described in detail heretofore, the explosion in power cylinder 16 results from the mixture with fuel of supercharged air flowing from compressor cylinder 12 through regulator valve 59, conduit 57, proportioning valve 56, conduit 58 and intake poppet 61 into the power cylinder. This air is mixed with fuel from fuel supply or tank 104, pump 101, valves 36, 91 and 111, and flowing through lines 94 and 68 to injector nozzle 67 under the control of piston 69 which is connected to the same rocker arm 64 that operates the intake poppet 61. The explosion occurs, due to a spark from plug 71, at approximately the time that power piston 23 is at top dead center, and results in a high pressure in the power cylinder 16 which forces the piston 23 downwardly. Such downward movement of piston 23, however, rapidly reduces the pressure in the power cylinder to a value at which poppet 51 will open to admit hot compressed air directly from compressor cylinder 12 as above stated. As shown in Figure 5, when the power piston 23 approaches bottom dead center (substantially after opening of poppet 51) the exhaust poppet 72 is opened by its cam and rocker arm, and the uniflow exhaust 77 is also opened, to effect rapid exhaust or scavenging of air and combustion products from both ends of the power cylinder.

Air and combustion products exhausted from the power cylinder and the compressor cylinder pass through uniflow outlets 44 and 77, and exhaust conduit 73, to the inlet of turbine 26. These gases flow radially inwardly through the turbine rotor 28 then out exhaust conduit 54, such flowing through the turbine rotor effecting rotation of compressor rotor 29.

Since the gases exhausted from the power and compressor cylinders are rich in oxygen, they may be employed to support further combustion, for example in an after burner located in advance of the intake to turbine 26. Alternatively, the turbine 26 may be an internal combustion turbine. Also, the air introduced into power cylinder 16 from conduit 49 past valve 51 may be employed to support additional combustion in the power cylinder itself.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a compressor, a compressor cylinder, a compressor piston mounted therein, a turbo-compressor having a turbine portion and a compressor portion, a duct connected at one end to the inlet of said turbine portion of said turbo-compressor and at the other end to said compressor cylinder at a point near the bottom dead center position of said piston, valve means to admit air from said compressor portion of said turbo-compressor to said compressor cylinder during the downstroke of said piston and until after said compressor piston on its upstroke has blocked said duct, and means additional to said duct to supply gas under pressure to said inlet of said turbine portion of said turbo-compressor.

2. A combination hot air and internal combustion engine, which comprises a compressor cylinder and a power cylinder, compressor and power pistons mounted, respectively, in said cylinders, a rotary air compressor having its outlet connected to said compressor cylinder, valve means to control the flow of air from said rotary air compressor to said compressor cylinder, a first conduit connecting said compressor cylinder to said power cylinder, a second conduit connecting said compressor cylinder to said power cylinder, second valve means to effect introduction of compressed air from said second conduit into said power cylinder while said power piston is moving upwardly and substantially prior to the time said power piston reaches top dead center, fuel means to introduce fuel into said power cylinder during at least part of the time that said second valve means is opened, third valve means to control flow of hot compressed air through said first conduit and to effect introduction of said hot compressed air into said power cylinder after the explosion of the fuel-air mixture in said power cylinder but substantially prior to the time said power piston reaches bottom dead center, and means to exhaust the air and products of combustion from said power cylinder at a time substantially after opening of said third valve means.

3. The invention as claimed in claim 2, in which said compressor and power pistons are connected to a common crankshaft in 90 degrees out-of-phase relationship, said power piston leading said compressor piston so that said compressor piston is approaching top dead center at the same time that said power piston is moving toward bottom dead center, and in which said third valve means includes spring operated valve means set to permit flow of air through said first conduit into said power cylinder when the pressure in said first conduit exceeds that in said power cylinder by a predetermined amount.

4. The invention as claimed in claim 2, in which said fuel means includes proportioning valve means to deliver fuel in proportion to the amount of air flowing through the said second conduit and also includes injector nozzle means to inject such fuel into said second conduit at a point adjacent said power cylinder, and in which spark means are provided to ignite the fuel-air mixture in said power cylinder at approximately the time said power piston reaches top dead center.

5. The invention as claimed in claim 2, in which said means to exhaust said power cylinder comprises a valve controlled conduit connected to the upper end of said power cylinder, and a second conduit connected to said power cylinder at a point adjacent the upper surface of said power piston when said piston is at bottom dead center.

6. The invention as claimed in claim 2, in which a conduit is connected at one end to said compressor cylinder at a point relatively adjacent the upper surface of said compressor piston when at bottom dead center, and at the other end to the turbine portion of an exhaust gas turbine, in which said rotary compressor is driven by said exhaust gas turbine, and in which means are provided to conduct exhaust gases from said power cylinder to said turbine portion, said conduit from said compressor cylinder to said turbine portion serving to permit high speed efficient operation of said exhaust gas turbine during low speed or idling operation of the engine.

7. A fuel-air system for a combination hot air and internal combustion engine in which compressed air is fed directly from a compressor cylinder to a power cylinder after the explosion in said power cylinder; said system comprising conduit means to conduct air from said compressor cylinder to said power cylinder independently of the direct connection therebetween, regulator means to regulate the pressure of the air delivered from said compressor cylinder to said conduit means, fuel supply means to deliver fuel to a fuel line leading to said power cylinder, means to proportion the flow of fluid through said fuel line and through said conduit means, and valve means to govern the flow of fluid from said conduit means and fuel line into said power cylinder.

8. The invention as claimed in claim 7, in which said regulator means comprises a regulator valve disposed in the head of said compressor cylinder, said valve including a spring biased hollow piston having port means to admit air from said compressor cylinder into said conduit means when the pressure in said compressor cylinder achieves a predetermined value.

9. The invention as claimed in claim 7, in which said fuel supply means includes a fuel pump, a casing having a floating piston therein, means to connect said conduit means to said casing at one side of said piston, means to connect said fuel pump to said casing at the other side of said piston, means to connect said casing at said other side of said piston to said fuel line, and return means to connect the fuel supply for said pump to said casing at said other side of said piston but at a point relatively adjacent said one side of said piston, said arrangement operating to permit return flow from said casing at said other side of said piston through said return means to said fuel supply and in quantities such that the pressure in said casing at said other side of said piston achieves a value bearing a predetermined relationship to the pressure in said conduit means.

10. The invention as claimed in claim 7, in which said proportioning means comprises means to define a chamber between the end of said conduit means connecting to said compressor cylinder and the end of said conduit means connecting to said power cylinder, said chamber defining means being so constructed that all air passing between said ends of said conduit means must flow through said chamber, first air valve means operated by the operator of the engine to admit air into said chamber from said end of said conduit means communicating with said compressor cylinder, valve means connected to said first air valve means to regulate the flow of fuel through said fuel line in accordance with the position of said first air valve means, second air valve means responsive to pressure in said chamber to permit outflow of air from said chamber into the end of said conduit means communicating with said power cylinder, and valve means connected to said second air valve means to effect regulation of the flow through said fuel line in accordance with the position of said second air valve means.

11. The invention as claimed in claim 10, in which means are provided to effect an increased flow through said fuel line when the engine is idling.

12. The invention as claimed in claim 7, in which said valve means comprises a cam operated valve to admit air from said conduit means into said power cylinder during a time when the power piston in said power cylinder is approaching top dead center, and an injector valve directly connected to the operating means for said cam operated valve, the positions of said cam operated valve and said injector valve being related to effect injection of fuel from said fuel line into said conduit means during the time that said cam operated valve is open.

13. A combination hot air and internal combustion engine, which comprises a plurality of compressor cylinders and a plurality of power cylinders disposed in V relationship with the compressor cylinders on one side of the V and the power cylinders on the other side thereof, compressor and power pistons mounted one in each of said compressor and power cylinders and connected to a common crankshaft, each of the power pistons being so connected to said crankshaft that it is 90 degrees ahead of an associated compressor piston, a plurality of hot air conduits each directly connecting a compressor cylinder to its associated power cylinder, valve means to permit flow of air through each of said hot air conduits when the corresponding compressor piston is approaching top dead center and the corresponding power piston is moving downwardly away from top dead center, a turbo-compressor, conduit and manifold means to conduct air from the compressor portion of said turbo-compressor to said compressor cylinders, conduit and manifold means to conduct exhaust gases from said power cylinders to the turbine portion of said turbo-compressor, a proportioning valve, means to conduct air at regulated pressure from said compressor cylinders to said proportioning valve and then from said proportioning valve to said power cylinders, means to supply fuel to said proportioning valve and thence to said power cylinders, and valve means to permit inflow of fuel and air from said proportioning valve to each of said power cylinders during upstroke of the power piston therein.

14. The invention as claimed in claim 13, in which conduit and manifold means are connected from each of said compressor cylinders, at a point adjacent the upper surface of its compressor piston when at bottom dead center to the inlet of said turbine portion of said turbo-compressor, and in which valve means are provided to admit air from said compressor portion of said turbo-compressor into each of said compressor cylinders during the downstrokes of the associated compressor pistons and until after such compressor pistons on their upstrokes have blocked the flow of air through said conduit and manifold means to said turbine portion of said turbo-compressor.

15. The invention as claimed in claim 13, in which means are provided to exhaust air and products of combustion from opposite ends of said power cylinders and to deliver such exhaust to the intake of said turbine portion of said turbo-compresor, said means including a valve controlled exhaust conduit connected to the upper end of each power cylinder and a second exhaust conduit connected to each power cylinder at a joint adjacent the upper surface of the associated power piston when at bottom dead center.

References Cited in the file of this patent

UNITED STATES PATENTS

| | | |
|---|---|---|
| 1,063,386 | Reuter | June 13, 1913 |
| 1,079,578 | Peterson | Nov. 25, 1913 |
| 1,212,917 | De Long | Jan. 16, 1917 |
| 1,305,581 | Wolfard | June 3, 1919 |
| 1,473,486 | McCallen | Nov. 6, 1923 |
| 1,645,170 | Whaley | Oct. 11, 1927 |
| 2,769,435 | Cass | Nov. 6, 1956 |

FOREIGN PATENTS

| | | |
|---|---|---|
| 244,032 | Great Britain | Mar. 18, 1926 |